United States Patent

[11] 3,609,726

[72] Inventor Victor E. Stewart, Jr.
  South Milwaukee, Wis.
[21] Appl. No. 690,980
[22] Filed Dec. 15, 1967
[45] Patented Sept. 28, 1971
[73] Assignee McGraw-Edison Company
  Milwaukee, Wis.

[54] REMOTE METER READING SYSTEM
  14 Claims, 5 Drawing Figs.
[52] U.S. Cl. ........................................ 340/204,
  340/190, 340/200
[51] Int. Cl. ...................................... G08c 9/02,
  G08c 19/10, G08c 19/28
[50] Field of Search ........................... 340/190,
  205, 204, 200

[56] References Cited
 UNITED STATES PATENTS
3,187,318 6/1965 Chapman ..................... 340/204

3,253,260 5/1966 Hawley ......................... 340/204
3,268,884 8/1966 Yanis ............................ 340/204
3,312,964 4/1967 Kahn ............................ 340/204
3,430,217 2/1969 Bridge .......................... 340/204
3,266,018 8/1966 Higgins ........................ 340/151

Primary Examiner—Thomas B. Habecker

ABSTRACT: A position encoder and transponder for use in an automatic remote meter reading system and including disc means coupled to the meter being read and perforated in accordance with a position code and position means having a plurality of photoresponsive information bit means operatively associated with the coded disc. An oscillator provides a tone signal in accordance with a capacitive parameter and capacitance means is associated with each photoresponsive means for being placed in a parallel circuit relation with the capacitive parameter in accordance with the position of the coded disc so that a different tone signal will be provided for each disc position.

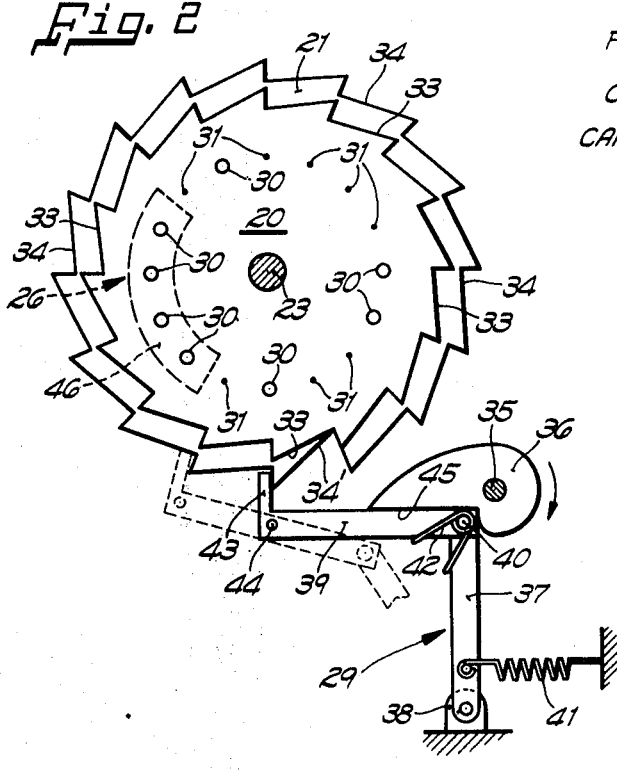
Fig. 2
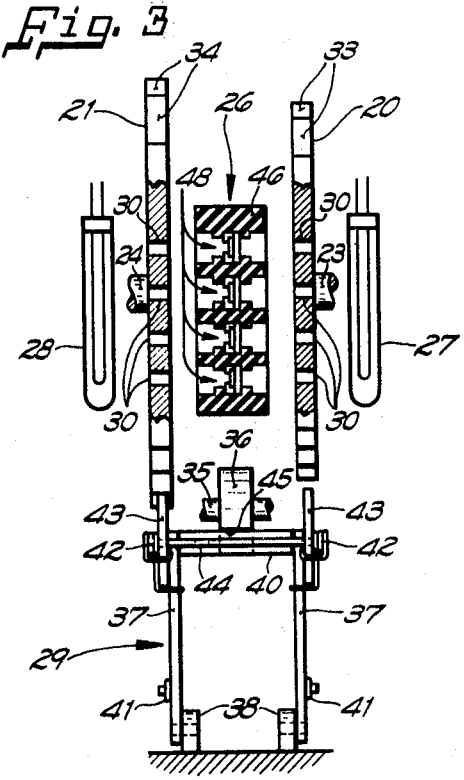
Fig. 3
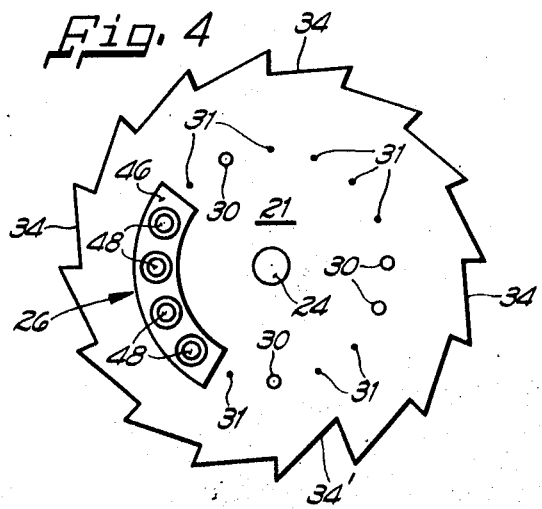
Fig. 4
Fig. 5
| PHOTOCELL | 48c | 48b | 48a | 48 | TOTAL CAPACITANCE nF |
|---|---|---|---|---|---|
| CAPACITOR | C4 | C3 | C2 | C1 | |
| CAPACITANCE | .8 | .4 | .2 | .1 | |
| POS. | BINARY CODE | | | | |
| 1 | O | O | O | O | 1.5 |
| 2 | O | O | O | • | 1.4 |
| 3 | O | O | • | O | 1.3 |
| 4 | O | • | O | • | 1.0 |
| 5 | • | O | • | • | .4 |
| 6 | O | • | • | • | .8 |
| 7 | • | • | • | • | .0 |
| 8 | • | • | • | O | .1 |
| 9 | • | • | O | O | .3 |
| 10 | • | O | O | • | .6 |
| 11 | O | O | • | • | 1.2 |
| 12 | O | • | • | O | .9 |
| 13 | • | • | O | • | .2 |
| 14 | • | O | • | O | .5 |
| 15 | O | • | O | O | 1.1 |
| 16 | • | O | O | O | .7 |
INVENTOR.
Victor E. Stewart, Jr.
BY Fred Wiviott
Attorney

3,609,726

REMOTE METER READING SYSTEM

BACKGROUND OF THE INVENTION

This invention relates to a position encoder and, more particularly, to a device for converting and analogue quantity representing the position of a shaft or other movable member into a digital quantity for transmission to a remote location. The invention has particular, but not exclusive, application to systems for the automatic remote reading of utility meters from a central station and numerically controlled machinery.

Utility meters, such as electric, gas and water meters, are generally widely distributed at the customers' points of useage. It is the present practice in the reading of such meters for a meter reader to visit each customer's site and to observe and record the registration on each unit. While there has been a large number of proposals for the automatic reading of such meters from a remote location, they have not been commercially adapted because of their high cost and because they could not meet the limitations imposed by existing utility meters and communication systems. Such limitations include expense and the relatively confined space available for encoding devices and utility metering equipment presenting installed.

It is an object of the invention to provide an economical encoding and signal transmitting assembly.

Another object of the invention is to provide an encoding and signal transmitting assembly which may be incorporated into the relatively confined space such as may exist in a utility meter.

Another object of the invention is to provide an encoder and signal transmitter wherein a single tone signal is used to represent a plurality of information bits.

These and other objects and advantages of the instant invention will be apparent from the description of the preferred embodiment hereinbelow.

SUMMARY OF THE INVENTION

A position encoder and transponder including first and second relatively movable means each having a plurality of code means, one code means being an array of code elements and the other code means being a plurality of information bit means, circuit means operable to produce variations in an output quantity in accordance with the magnitude of a circuit variable, circuit variable modifying means associated with the other code means and being operative to produce a different predetermined modification of the circuit variable for each relative position of the code elements and information bit means so that a predetermined different circuit variable will exist for each relative position of the first and second means to provide a predetermined different variation in output quantity for each of the positions which represents information from each of the information bit means.

BRIEF DESCRIPTION OF THE DRAWINGS

FIGS. 2, 3 and 4 illustrate a coded disc and information bit configuration useable with the instant invention; and FIG. 5 is a table illustrating an example of the code and tone transmitted by the encoder and transmitter illustrated in FIGS. 1-4.

DESCRIPTION OF THE PREFERRED EMBODIMENT

Figure 1:
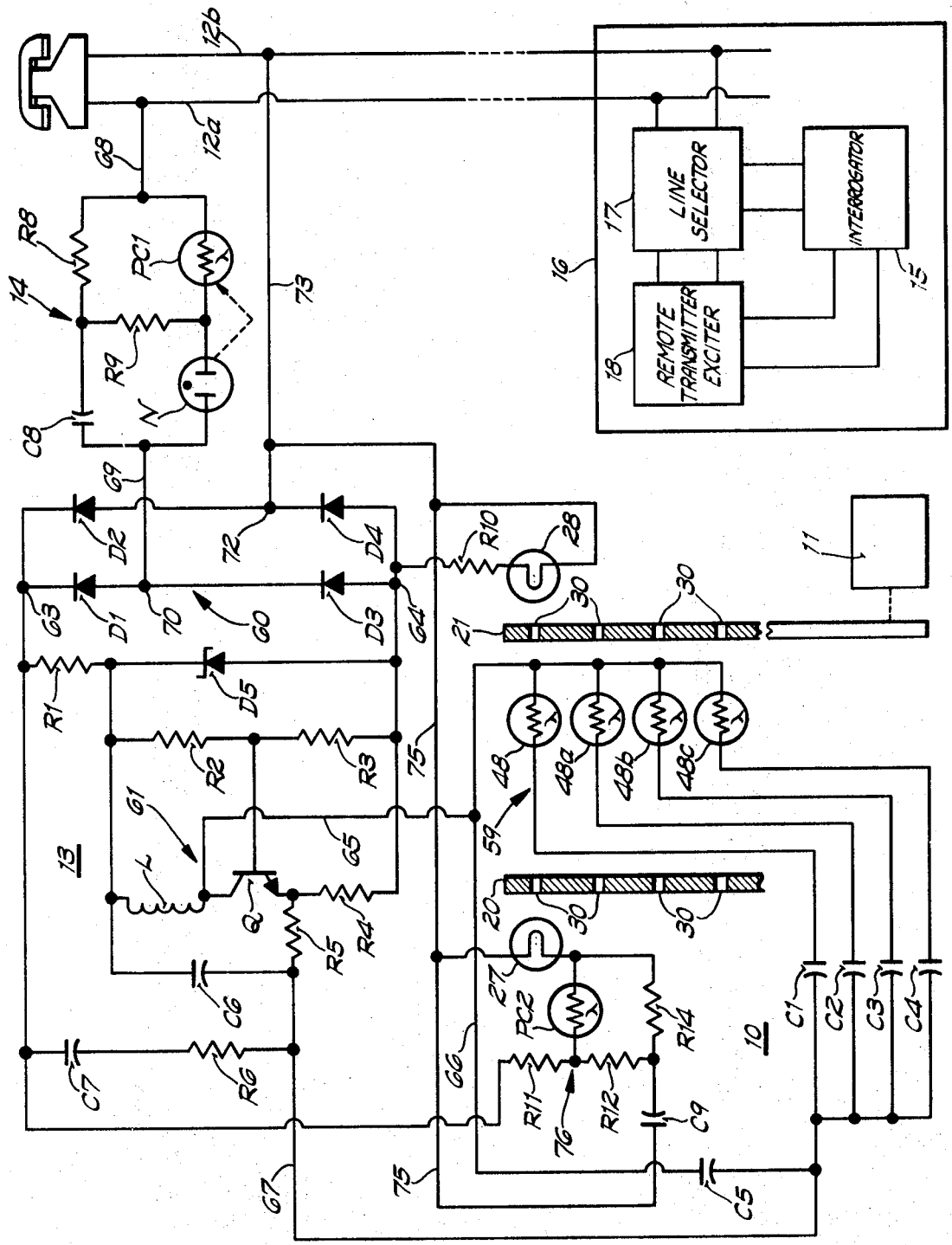
FIG. 1 shows a remote meter reading system incorporating the encoder and signal transmitter according to the instant invention.

FIG. 1 shows an automatic remote meter reading system in which an encoder 10 and a transmitter 13, according to the instant invention, are employed. The encoder 10 is mechanically coupled to the meter 11 which is to be read and to the customers' telephone lines 12a and 12b through the transmitter 13 and a line coupler 14. An interrogator 15 at the telephone exchange 16 is coupled to the lines 12a and 12b through a line selector 17 and remote transmitter exciter 18.

The details of the meter 11, the interrogator 15, the line selector 17 and the remote transmitter exciter 18 form no part of the instant invention and, accordingly, will not be discussed in detail. It is sufficient for purposes of understanding the instant invention to note that, when it is desired to read the meter 11, the interrogator 15 is actuated and in turn actuates the line selector 17 and the remote transmitter exciter 18. The remote transmitter exciter 18 then sends a signal through the lines 12a 12b which actuates the line coupler 14, whereby the encoder 10 and the transponder 13 are actuated and coupled to the lines 12a and 12b. The encoder 10 provides the coded information relative to the registration of meter 11 to the transmitter 13 which, in turn, transmits the information to the interrogator 15. The transmitter 13 may take the form of an oscillator, and the encoder may change the parameters of the oscillating circuit as a function of the meter registration, whereby different tone signals will be placed on the lines 12a and 12b in accordance with the reading of meter 11.

FIGS. 2 and 3 show the preferred embodiment of the encoding device 10 in greater detail to include a pair of coded discs 20 and 21 which are respectively mounted for rotation about central shafts 23 and 24, a sensor assembly 26, a pair of lamps 27 and 28 and a drive assembly 29 for coupling discs 20 and 21 to the meter being read.

The discs 20 and 21 are provided with an array of coding units one coding unit being provided for each disc position. In the illustrated embodiment, wherein each of the discs 20 and 21 has 16 positions, 16 coding units are provided on each disc. Also, where the sensor assembly 26 is photosensitive, the coding units comprise holes or transparent positions 30 and unperforated opaque positions 31.

As seen in FIG. 2, the coding units 30 and 31 are arranged on the disc 20 in a substantially equally spaced circular array. A similar array of units 30 and 31 are arranged on the disc 21. As will be pointed out more fully hereinbelow, the arrangement of holes 30 and opaque positions 31 are such that, when used with at least a four-unit sensor assembly 26, an unambiguous code will be provided for each of the 16 positions of the discs 20 and 21.

In addition, the outer periphery of each of the discs 20 and 21 is coupled to a drive assembly 29 which is operative to successively step the disc 20 through each of its 16 positions and then to advance the disc 21 one position for each revolution of the disc 20. The details of the drive assembly 29 form no part of the instant invention and, accordingly, will not be discussed in detail. One example of a drive mechanism capable of performing these functions is described in copending application Ser. No. 15,362, filed Mar. 2, 1970, and assigned to the assignee of the instant invention. It is sufficient for purposes of understanding the instant invention to note that the drive assembly 29 is coupled to the meter 11 and that it will step the disc 20 one position for each of a predetermined number of revolutions of the meter assembly 11.

As seen in FIGS. 2 and 3, the sensor assembly 26 comprises an opaque head 46 which is disposed between the discs 20 and 21 and in close parallelism thereto. When 16 position discs are provided, the sensor assembly 26 includes at least four sensor units or information bit means 48, 48a, 48b and 48c, which are spaced along the arcuate head 46 at the same distance as that between the coding units 30 and 31. The details of the sensor units 48-48c also form no part of the instant invention and, accordingly, will not be discussed in detail. It is sufficient for purposes of understanding the instant invention to note that each may comprise a photoresistive element which normally has a relatively high impedance and which changes to a low impedance state upon being illuminated. For a more complete description of sensor units 48-48c which may be employed with the instant invention, reference is again made to said application Serial Number.

The sensor units 48-48c are arranged so that for each position of the discs 20 and 21 one of the sensor units will face one of the coding units 30 or 31 in each of the discs 20 and 21. The lamps 27 and 28 are disposed adjacent the outer surfaces of each of the discs 20 and 21 and in an opposed relation to the sensor assembly 26. As will be pointed out more fully hereinbelow, the lamps 27 and 28 are connected to be sequentially energized so that the sensor units 48–48c will be selectively energized through the holes 30 in the disc 20 by light emitted from the lamp 27 and then from the opposite sides through holes 30 in disc 21 by light emitted from the lamp 28. The position code for the disc 20 will be determined by which ones of the sensor units 48–48c are energized when the lamp 27 is lit, and similarly, the position code for the disc 21 will be determined by which ones of the sensor units 48–48c are illuminated when the lamp 28 is lit. It will be understood that only those sensor units 48–48c which are opposite a hole 30 in the appropriate one of the discs 20 or 21 will be illuminated, while those adjacent an opaque position 31 will remain unenergized.

The drive assembly 29 includes a scroll cam member 36 which is fixed to a shaft 35 coupled to the meter being read. The cam 36 cooperatively engages a pawl assembly for stepping the discs 20 and 21 and which comprises a first pair of parallel links 37 having one end pinned at fixed pivot point 38 and a second pair of links 39 pivotally coupled to the other end of links 37 by knee pin 40. Spring 41 holds pin 40 in resilient engagement with the cam 36, and springs 42 urge clockwise rotation of links 39 to urge fingers 43 carried by their free ends into engagement with the teeth 33 and 34 on discs 20 and 21.

The diameter of the disc 21 is sufficiently greater than that of the disc 20 so that the radially outward extremity of disc 20 does not extend to the innermost portion of the teeth 34. As a result, one of the fingers 43 will engage the teeth 34 on disc 21, but the other finger 43 will normally be held out of engagement with the teeth 33 of disc 20 by a pin 44 which couples the ends of links 39. However, one of the teeth 34 on the disc 21, and designated 34', is deeper than the remaining teeth so that the teeth 33 on disc 20 will extend past its inner extremity.

As those skilled in the art will appreciate, the cam member 36 may be coupled to the meter by a gear drive (not shown) in such a manner that the cam member 36 will make one revolution for each of a predetermined number of revolutions in the meter assembly (not shown). As the cam member 36 rotates clockwise, as seen in FIG. 2, the links 37 and 39 are moved from their full to their phantom position wherein the finger 43 will move into engagement with the succeeding one of the teeth 34 on disc 21. As the cam member 36 completes one revolution, wherein its flat portion 45 is moved into engagement with the pin 40, the spring 41 will return links 37 and 39 to their full position, thereby moving the disc 21 one position in the counterclockwise direction. The disc 20 will remain stationary, however, because the other finger 43 will be held out of engagement with its teeth 33 by the larger outer periphery of the disc 21 and the pin 44.

After the disc 21 has completed one revolution wherein the tooth 34' is in a position to be engaged by the one finger 43, the greater depth of tooth 34' will allow engagement between the other finger 43 and one of the teeth 33 of the disc 20. In this manner, the disc 20 will be moved one position for each complete revolution of the disc 21.

If the position of the discs 20 and 21, as shown in FIGS. 2 and 3, is taken as the first position, each of the photosensitive units 48–48c will be illuminated when the lamps 27 and 28 are lit. As the discs 20 and 21 are stepped through each of their 16 positions, a different arrangement of photosensitive units 48–48c will be illuminated to provide the 16 position unambiguous code shown in FIG. 5.

Reference is again made to FIG. 1 which illustrates how the sensor units are coupled to the transmitter 13. More specifically, the sensor units 48, 48a, 48b and 48c are respectively connected in series with capacitors C1, C2, C3 and C4, and the series combinations are connected in parallel with each other and with a capacitor C5. As will become more apparent hereinbelow, the sensor units 48–48c and the capacitors C1–C4 comprise a capacitive incrementing circuit 59 with respect to the capacitor C5.

The transmitter 13 may include a diode bridge 60 and an oscillating circuit 61. The diode bridge consists of diodes D1, D2, D3 and D4 which are connected between the oscillating circuit 61 and the encoder 10, on the one hand, and the coupling circuit 14 on the other. When the coupling circuit 14 is active, a DC voltage will be supplied to the output terminals 63 and 64 of the diode bridge 60. A Zener diode D5 and a resistor R1 may be connected in series across the terminals 63 and 64 for providing a constant voltage to the oscillator 61.

Oscillator 61 includes an amplifier comprising a transistor Q and a first pair of resistors R2 and R3 which are connected in series across Zener diode D5 and their junction connected to the base of transistor Q and a third resistor R4 which is connected between the emitter of transistor Q and terminal 64. Oscillator 61 also includes a Colpitts feedback circuit consisting of an inductance L connected between the collector of transistor Q and the other terminal of resistor R2, and a first capacitor C6 connected between the other terminal of inductor L and by resistor R5 to the emitter of transistor Q. Capacitor C5 constitutes a second capacitance in the Colpitts feedback circuit and is connected by conductors 65, 66 and 67 and resistor R5 between the emitter and collector of transistor Q.

The transmitter 13 also includes a resistor R6 and a capacitor C7 which are connected in series between the terminal 63 and resistor R5. Capacitor C7 functions to decoupled the emitter of transistor Q from terminal 63, and resistor R6 desensitizes the oscillator output frequency to changes in the impedance of the lines 12a and 12b.

The coupling circuit 14 includes a photocell PC1 and a neon lamp N which are connected in series with each other and by conductors 68 and 69 between one of the customer lines 12a and one input terminal 70 of diode bridge 60. The coupling circuit also includes a resistor R8 and a capacitor C8 which are connected in series with each other between conductors 68 and 69. A second resistor R9 connects the junction between resistor R8 and capacitor C8 and that between photocell PC1 and the neon lamp N. The other terminal 72 of the diode bridge 60 is connected by conductor 73 to the other one of the customer lines 12b.

The normal telephone central office battery voltage applied to the lines 12a and 12b, which is in the order of 48 volts, DC is insufficient to fire the neon lamp N so that the coupling circuit 14 is normally inactive and conductors 68 and 69 are effectively open circuits.

High dialing and ringing peak voltages, which may be in the order of 400 volts, are of insufficient duration to cause operation of the coupling circuit 14. When the remote transmitter exciter is actuated, however, a voltage of approximately 200 volts is applied between the lines 12a and 12b. As a result, sufficient charge will accumulate on capacitor C8 to break down the neon lamp N, causing the latter to illuminate the photocell PC1. This, in turn, causes the photocell PC1 to go from a high impedance state to a low impedance state, thereby connecting the conductors 68 and 69. As long as the input voltage signal is greater than the lamp bolding voltage, lamp N will remain illuminated so that coupling circuit 14 will, in effect, remain latched in its conductive, or active, state.

Lamps 27 and 28 have a common terminal connected by conductor 75 to conductor 73. In addition, the other terminal of lamp 28 is connected to bridge output terminal 64 by resistor R10, and the other terminal of lamp 27 is connected to bridge output terminal 63 by an RC time delay circuit 76. The latter circuit includes resistors R11 and R12 and capacitor C9 which are connected in series between diode bridge terminal 63 and conductor 75. In addition, resistor R14 and photoresistor PC2 are connected to the other terminal of lamp 27 and to the junction between resistors R11 and R12 and between resistor R12 and capacitor C9, respectively.

When the photocells 48, 48a, 48b and 48c are not illuminated, they are in a high impedance state so that the capacitors C1, C2, C3 and C4 are effectively open circuited and the oscillator 61 sees merely the capacitance of C5. When either of the lamps 27 and 28 is energized, only those photocells which are opposite the holes 30 will be illuminated and thereby go from a high impedance state to a low impedance state. Thus, those capacitors connected in series with an illuminated photocell will be effectively connected in parallel with capacitor C5 so that the oscillator 61 sees a higher value of total capacitance. Preferably, capacitors C1, C2, C3 and C4 each have a different predetermined capacitance which are related so as to provide a different parallel capacitance with respect to the capacitor C5 for each position of the discs 20 and 21. For example, capacitors C1, C2, C3 and C4 may be 1nf, 2nf and 4nf 8nf, respectively, as shown in FIG. 5, so as to provide the indicated parallel capacitance for each disc position.

As those skilled in the art will appreciate, the frequency of the oscillator 61 will be given by the expression:

where
$$f \cong \frac{1}{2\pi \sqrt{LC}}$$
$$C \cong (1/C6 + 1/C5 + C_n)^{-1}$$

and $C_n$ is the sum of those ones of the capacitances C1, C2, C3 and/or C4 that are connected in parallel with capacitance C5 as the result of their respective photocells 48, 48a, 48b and/or 48c being illuminated through the holes 30 in the discs 20 or 21. As a result, the oscillator 61 will have a different output frequency for each position of the disc 20 and 21.

Assume that a reading of the meter 12 is to be taken. The interrogator 15 is actuated and this, in turn, actuates the remote transmitter exciter and the line selector which selects the particular customer lines 12a and 12b. the remote transmitter exciter 18 places a positive potential signal on the line 12a and a negative potential signal on line 12b. Capacitor C8 will charge to a sufficiently high voltage to break down the neon lamp N. This illuminates the photocell PC1 which then changes from a high impedance state to a low impedance state, whereby current may continue to flow to lamp N. With the photocell PC1 in its low impedance state, the lamp N will remain illuminate as long as the voltage signals appear in the customer lines 12a and 12b.

The diode bridge 60 performs the function of signal receiving and mode selection. More specifically, the bridge 60 receives the actuating signals from the remote transmitter exciter 18 and selects which of the lamps 27 and 28 will be energized so that the discs 20 and 21 may be selectively read.

When the coupling circuit becomes active, voltage appears across the diode bridge output terminals 63 and 64 which energizes the oscillator 61. In addition, this voltage, less the small drop across diode D4, appears across the lamps 27 time delay circuit 76, which momentarily prevents lamp 27 from illuminating. The voltage across lamp 28 will be that across the diode D4, and this will be insufficient to break the lamp down. Initially, therefore, only capacitors C5 and C6 will be in the oscillator 61 circuit and, accordingly, a reference frequency signal will be placed on the lines 12a and 12b and received by the interrogator 15. After a time delay determined by the values of resistance and capacitance in the time delay circuit 76 and the lamp breakdown voltage, the lamp 27 will be illuminated and predetermined ones of the photocells 48, 48a, 48b and 48c will be activated in accordance with the position of the disc 20. This will modify the capacitance seen by the oscillator 61, and, accordingly, a second frequency signal will be applied to the lines 12a and 12b to indicate the position of the disc 20.

It will be appreciated that the second frequency signal will be some increment below that of the first or reference frequency signal. By thus reading the disc position as a predetermined variation or percentage of the reference frequency, rather than as a discrete frequency, variations in capacitive values as the result of aging, for example, will not prevent unambigous readings.

After the disc 20 reading has been received, the remote transmitter capacitances will reverse the polarity of interrelated customer lines 12a and 12b so that the lamp 28 will be energized through conductor 73, resistor R10 and diode D3. The oscillator 61 is energized through diodes D3 and D2 while diode D1 prevents energization of the lamp 27. As a result, a reading may be taken on the position of the disc 21. Here again, certain of the photocells 48, 48a, 48b and 48c may be illuminated in accordance with the position of the disc 21 so that certain ones of the capacitors C1, C2 C3 and C4 may be connected in parallel with the capacitor C5. This will again provide a tone signal in accordance with the reading of the disc 21 to the customer lines 12a AND 12b which is received by the interrogator 15.

Because the disc 21 makes sixteen steps for each step of the disc 20, a total of 256 steps of the meter 12 is possible for each encoder register cycle. If meter readings of a greater number of steps per cycle are desired the discs 20 and 21 may be made with a greater number of code units 30 and 31, or an additional set of discs, lamps and sensor units may be provided.

It will be appreciated that the capacitive incrementing circuit 59 allows miniaturization in the encoder 10 and transmitter 13 in that the positions of both discs 20 and 21 may be read through a single pair of conductors 65 and 67. It will also be appreciated that additional discs could also be read through conductors 65 and 67 by providing further selectively operable lamps and/or additional photocells or capacitive incrementing circuits 59 having different capacitive values so that different tone signals will be produced.

Also, the use of the capacitive incrementing circuit 59 consisting of capacitors C1, C2, C3 and C4 which are switched through photocells 48, 48a, 48b and 48c, respectively, allows the addition and subtraction of discrete values of capacitance without the use of expensive switching devices. This further facilitates the compactness and economies of the encoder 10. In addition, the combination of the capacitance incrementing circuit with the oscillator permits the use of a single tone signal to represent a plurality of information bits, rather than a different tone signal for each information bit, as in some prior art devices.

While in the preferred embodiment of the instant invention switching of the capacitors C1, C2, C3 and C4 is performed by the photocells 48–48c, it will be appreciated that this switching function could be performed by other devices as well. In addition, it is not necessary that a capacitive incrementing circuit be employed to modify the tone signal output of an oscillator, but an incrementing circuit which modifies other impedances, such as inductances, could also be employed to modify the output tone signal of an oscillator so that a single tone signal could be provided to convey data in a plurality of information bits.

Accordingly, while only a single embodiment of the invention has been shown and described, it is not intended to be limited thereby, but only by the scope of the appended claims.

I claim:

1. A position encoder and transmitter comprising a means for indicating a plurality of selected conditions, a circuit means for producing an output frequency having a value controlled by a circuit capacitance, a plurality of different value circuit modifying capacitances selectively associated with the selected conditions, and a means for connecting selected different combinations of said modifying capacitances in respective relationship with each of the conditions to the circuit means to thereby produce a different output frequency value for each of said conditions.

2. An encoding and transmitting apparatus comprising:
   a converting means for indicating a preselected number of quantities,
   a circuit means for producing an output signal having a selected frequency and having a circuit capacitance connected to control said output frequency,
   a plurality of modifying capacitances operatively associated with the converting means with each capacitance having a different selected value, and
   a control means responsive to the quantity indicated by the converting means for connecting a different selected combination of modifying capacitances in operative association with the circuit means to thereby produce a different output frequency for each quantity indicated by said converting means.

3. An apparatus according to claim 2 wherein said converting means comprises a coded member movable to a different position for each quantity indicated.

4. An apparatus according to claim 2 wherein said circuit means, circuit capacitance and modifying capacitances are selected so that said output signal in a tone signal of a selected frequency controlled by the circuit capacitance and modifying capacitances.

5. An apparatus according to claim 2 wherein said converting means comprises a member movable to a different position for each quantity indicated having selectively positioned transparent and opaque portions, and a light source on one side of the member.

6. An apparatus according to claim 5 wherein said control means comprises photocells adjacent the member and responsive to light passed through the transparent portions to connect the modifying capacitances to the oscillator circuit.

7. A position encoder and transmitter comprising a member movable to a plurality of positions, an oscillator circuit having an output frequency controlled by a circuit capacitance, a plurality of circuit modifying capacitances having different values selectively associated with respective positions of said member, and a means for connecting selected different combinations of said capacitances in operative association with the oscillator circuit for each position of said member to thereby provide a different output frequency for each of said positions.

8. The combination set forth in claim 7 wherein the modifying capacitances and capacitance values totals are interrelated according to a digital code.

9. The combination set forth in claim 7 wherein said means for connecting connects a selected different combination of modifying capacitances to the circuit capacitance for each relative position of said member.

10. The combination set forth in claim 9 wherein said circuit capacitance and said modifying capacitances are selected to produce a different output tone signal for each position of said member.

11. The combination set forth in claim 9 wherein said means for connecting couples the selected modifying capacitances in a parallel circuit relation with the circuit capacitance 12. The combination set forth in claim 7 wherein said member is coupled for movement to a device whose position is to be determined and has at least one code unit for each position.

13. The combination set forth in claim 14 wherein said means for connecting comprises photoresponsive elements and the code units are transparent and opaque portions of the member.

14. The combination set forth in claim 13 wherein said photoresponsive elements are each connected in series with a respective modifying capacitance and said elements have a high impedance when unilluminated to effectively create an open circuit and a low impedance when illuminated to effectively create a closed circuit.